(12) United States Patent
Koiwa et al.

(10) Patent No.: US 10,461,349 B2
(45) Date of Patent: *Oct. 29, 2019

(54) METHOD FOR CONTROLLING FUEL CELL SYSTEM

(71) Applicant: HONDA MOTOR CO., LTD., Tokyo (JP)

(72) Inventors: Nobuki Koiwa, Wako (JP); Osamu Ogami, Wako (JP); Yuji Matsumoto, Wako (JP); Kenji Taruya, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 69 days.

This patent is subject to a terminal disclaimer.

(21) Appl. No.: 15/428,150

(22) Filed: Feb. 9, 2017

(65) Prior Publication Data

US 2017/0250415 A1    Aug. 31, 2017

(30) Foreign Application Priority Data

Feb. 26, 2016 (JP) ................................ 2016-035375

(51) Int. Cl.
    *H01M 8/04858* (2016.01)
    *H01M 8/0432* (2016.01)
    (Continued)

(52) U.S. Cl.
    CPC ..... *H01M 8/0491* (2013.01); *H01M 8/04358* (2013.01); *H01M 8/04649* (2013.01);
    (Continued)

(58) Field of Classification Search
    CPC ........... H01M 8/04089; H01M 8/0435; H01M 8/04365; H01M 8/04395; H01M 8/04492;
    (Continued)

(56) References Cited

U.S. PATENT DOCUMENTS 7,279,878 B2 * 10/2007 Ootani .................. H02M 3/156
                                                    323/222
7,300,716 B2 * 11/2007 Saliger ............... H01M 8/04119
                                                    429/430

(Continued)

FOREIGN PATENT DOCUMENTS

| JP | 07-235324   | 9/1995 |
| JP | 2004-265862 | 9/2004 |
| JP | 2009-026496 | 2/2009 |

OTHER PUBLICATIONS

Japanese Office Action for corresponding JP Application No. 2016-035375, dated Aug. 29, 2017 (w/ English machine translation).

*Primary Examiner* — Helen Rossosheki
(74) *Attorney, Agent, or Firm* — Mori & Ward, LLP

(57) ABSTRACT

A method for controlling a fuel cell system including a fuel cell, includes generating electric current via an electrochemical reaction between a fuel gas and an oxidant gas by the fuel cell including a solid polymer electrolyte membrane. An impedance of the fuel cell is detected. It is determined whether the impedance reaches a threshold impedance. The electric current generated by the fuel cell is increased when the impedance is determined to reach the threshold impedance.

15 Claims, 4 Drawing Sheets

(51) Int. Cl.
  *H01M 8/04537* (2016.01)
  *H02J 7/00* (2006.01)
  *H01M 8/04701* (2016.01)
  *H01M 8/1018* (2016.01)

(52) U.S. Cl.
  CPC ....... *H01M 8/04708* (2013.01); *H02J 7/0052* (2013.01); *H01M 2008/1095* (2013.01); *H01M 2250/20* (2013.01); *Y02T 90/32* (2013.01)

(58) Field of Classification Search
  CPC ......... H01M 8/04641; H01M 8/04649; H01M 8/04708; H01M 8/04753; H01M 8/04865; H01M 8/04873; H01M 8/04902; H01M 2250/20; H01M 2008/109; Y02E 60/50; Y02T 90/32; H02J 7/0052
  See application file for complete search history.

(56) References Cited

U.S. PATENT DOCUMENTS

| | | | | |
|---|---|---|---|---|
| 7,560,184 B2* | 7/2009 | Sonai | .................... | H01M 8/103 429/314 |
| 8,221,924 B2* | 7/2012 | Kajiwara | ............ | H01M 8/04119 429/428 |
| 8,252,470 B2* | 8/2012 | Ishikawa | ........... | H01M 8/04029 429/436 |
| 8,580,449 B2* | 11/2013 | Naganuma | ........ | H01M 8/04089 429/432 |
| 8,916,307 B2* | 12/2014 | Suematsu | ......... | H01M 8/04641 429/413 |
| 8,980,486 B2* | 3/2015 | Usami | ............... | H01M 8/04029 429/414 |
| 9,373,860 B2* | 6/2016 | Jeong | ................ | H01M 8/04649 |
| 2014/0162152 A1* | 6/2014 | Darling | ............ | H01M 8/04171 429/414 |
| 2015/0380755 A1* | 12/2015 | Kazuno | ............ | H01M 8/04873 429/432 |
| 2016/0190613 A1* | 6/2016 | Shiokawa | ......... | H01M 8/04067 429/413 |
| 2017/0250423 A1* | 8/2017 | Koiwa | ............. | H01M 8/04753 |
| 2017/0250425 A1* | 8/2017 | Koiwa | ............. | H01M 8/04895 |
| 2017/0250426 A1* | 8/2017 | Hamachi | .......... | H01M 8/04955 |
| 2018/0114996 A1* | 4/2018 | Park | .................... | H01M 8/0491 |
| 2018/0212262 A1* | 7/2018 | De Beer | ........... | H01M 8/04641 |
| 2018/0358636 A1* | 12/2018 | Sato | ................. | H01M 8/04858 |

* cited by examiner

METHOD FOR CONTROLLING FUEL CELL SYSTEM

CROSS-REFERENCE TO RELATED APPLICATIONS

The present application claims priority under 35 U.S.C. § 119 to Japanese Patent Application No. 2016-035375, filed Feb. 26, 2016, entitled "Method for Controlling Fuel Cell System." The contents of this application are incorporated herein by reference in their entirety.

BACKGROUND

1. Field

The present disclosure relates to a method for controlling a fuel cell system.

2. Description of the Related Art

A solid polymer electrolyte fuel cell includes a membrane electrode assembly (MEA), in which an anode electrode is disposed on one surface of an electrolyte membrane, which is a proton-conductive polymer ion-exchange membrane, and a cathode electrode is disposed on the other surface of the electrolyte membrane. The membrane electrode assembly and separators, sandwiching the membrane electrode assembly, constitute a power generation cell (unit cell). Typically, a predetermined number of power generation cells are stacked and, for example, mounted in a fuel cell vehicle (a fuel cell electric automobile or the like) as a vehicle fuel cell stack.

The fuel cell generates electric power by causing an electrochemical reaction between a fuel gas (such as hydrogen gas) supplied to the anode electrode and an oxidant gas (such as compressed air) supplied to the cathode electrode. During power generation, protons are generated at the anode electrode, and the protons are conducted through the electrolyte membrane and move to the cathode electrode. At the cathode electrode, protons, electrons, and oxygen in the oxidant gas react to generate water.

The electrolyte membrane needs to be moist so that the electrolyte membrane can conduct protons. For this purpose, the generated water and moisture added to the oxidant gas keep the electrolyte membrane moist. However, if the inside of the fuel cell becomes excessively moist, water is retained in the fuel cell. Because the retained water blocks small holes in the electrodes, it becomes difficult for reactant gases to reach the electrodes, and the rate of the electrochemical reaction is reduced.

In order to prevent this, Japanese Unexamined Patent Application Publication No. 7-235324 describes that whether or not the cathode electrode is excessively moist is determined on the basis of the impedance of the fuel cell and that, when it is determined that the cathode electrode is excessively moist, the oxidant gas that has bypassed a humidifier is supplied to the cathode electrode. In this case, in an attempt to remove water droplets adhering to the cathode electrode, comparatively dry oxidant gas is blown against the water droplets.

SUMMARY

According to a first aspect of the present invention, a method for controlling a fuel cell system including a fuel cell, includes generating electric current via an electrochemical reaction between a fuel gas and an oxidant gas by the fuel cell including a solid polymer electrolyte membrane. An impedance of the fuel cell is detected. It is determined whether the impedance reaches a threshold impedance. The electric current generated by the fuel cell is increased when the impedance is determined to reach the threshold impedance.

According to a second aspect of the present invention, a method for controlling a fuel cell system including a fuel cell, includes generating electric current via an electrochemical reaction between a fuel gas and an oxidant gas by the fuel cell including a solid polymer electrolyte membrane. Oxidant gas supplied to the fuel cell is cooled with a coolant. It is determined whether a temperature of the coolant reaches a threshold temperature. The electric current generated by the fuel cell is increased when the temperature of the coolant is determined to reach the threshold temperature.

According to a third aspect of the present invention, a method for controlling a fuel cell system including a fuel cell, includes generating electric current via an electrochemical reaction between a fuel gas and an oxidant gas by the fuel cell including a solid polymer electrolyte membrane. An impedance of the fuel cell is detected. It is determined whether the impedance reaches a threshold impedance. Oxidant gas supplied to the fuel cell is cooled with a coolant. It is determined whether a temperature of the coolant reaches a threshold temperature. The electric current generated by the fuel cell is increased when the impedance is determined to reach the threshold impedance or when the temperature of the coolant is determined to reach the threshold temperature.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
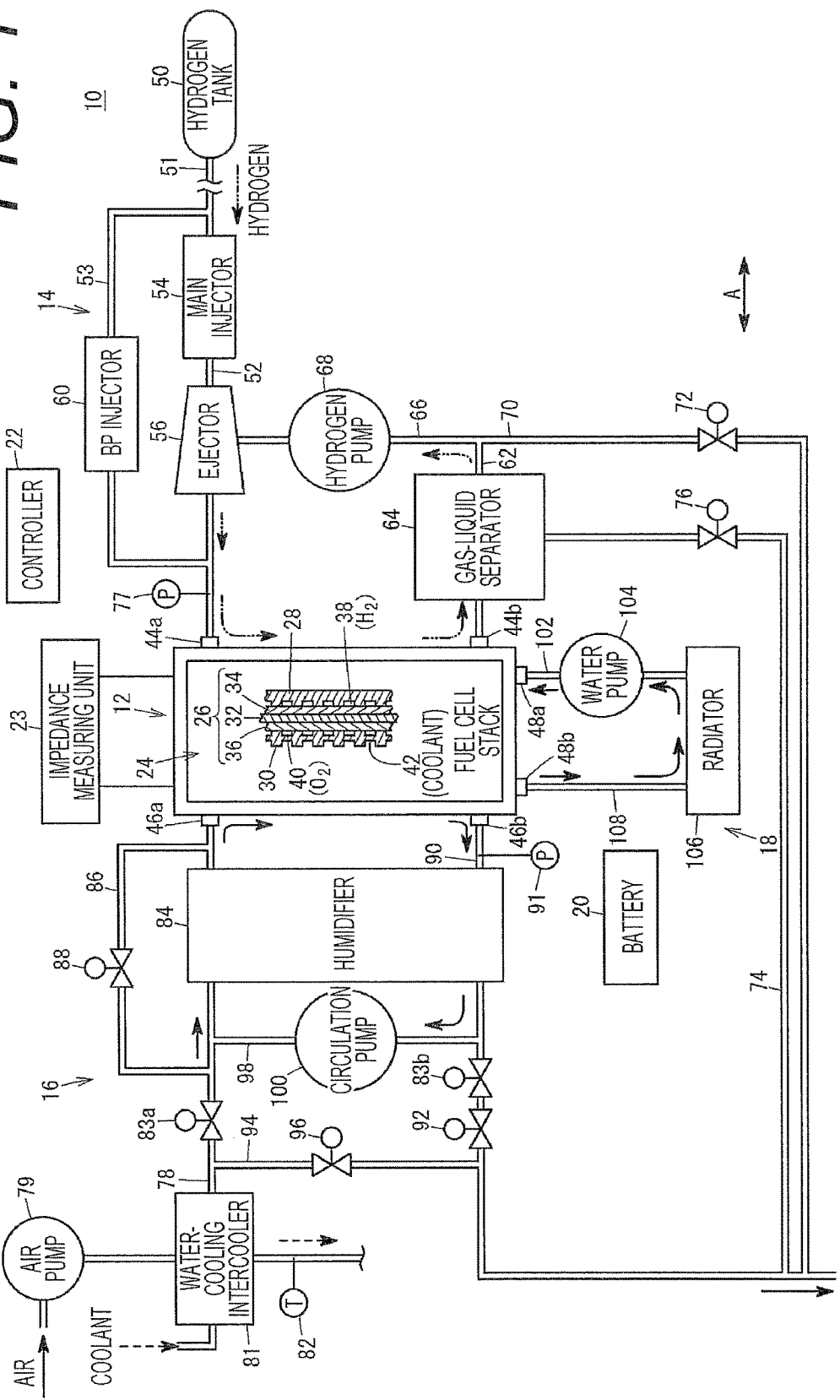
FIG. 1 is a schematic diagram of a fuel cell system to which a method according to an embodiment of the present disclosure is applied.

The embodiments will now be described with reference to the accompanying drawings, wherein like reference numerals designate corresponding or identical elements throughout the drawings.

Hereinafter, an embodiment of a method for controlling a fuel cell system according to the present disclosure will be described in detail with reference to the drawings. In the present embodiment, an example in which the fuel cell system is mounted in a fuel cell vehicle, such as a fuel cell electric automobile, is described.

First, a fuel cell system 10 will be described with reference to FIG. 1, which is a schematic diagram. The fuel cell system 10 includes a fuel cell stack 12 (fuel cell).

The fuel cell stack 12 includes a fuel gas supply device 14 that supplies a fuel gas, an oxidant gas supply device 16 that supplies an oxidant gas, and a coolant supply device 18 that supplies a coolant. In the present embodiment, hydrogen gas is used as the fuel gas, and compressed air is used as the oxidant gas. The fuel cell system 10 further includes a battery 20 (storage battery) that is an energy storage device, a controller 22 that is a system control device, and an impedance measuring unit 23.

In FIG. 1, for ease of understanding, the controller 22 and the impedance measuring unit 23 are independently illustrated. In reality, however, the impedance measuring unit 23 is a part of the controller 22. As described below, the impedance measuring unit 23 determines whether a solid polymer electrolyte membrane 32 is likely to become dry or likely to become moist on the basis of the impedance value of the fuel cell stack 12 (power generation cells 24).

The fuel cell stack 12 includes a plurality of power generation cells 24 that are stacked in the direction of arrow A (a horizontal direction or a vertical direction) in FIG. 1. In each of the power generation cells 24, a membrane electrode assembly 26 is sandwiched between a first separator 28 and a second separator 30. The first separator 28 and the second separator 30 are made of metal or carbon.

The membrane electrode assembly 26 includes, for example, the solid polymer electrolyte membrane 32, which is a thin water-soaked perfluorosulfonic acid membrane, and an anode electrode 34 and a cathode electrode 36 that sandwich the solid polymer electrolyte membrane 32. Instead of a fluoropolymer electrolyte, a hydrocarbon (HC) electrolyte may be used as the solid polymer electrolyte membrane 32.

A hydrogen gas channel 38 (fuel gas channel), for supplying hydrogen gas to the anode electrode 34, is formed on a surface of the first separator 28 facing the membrane electrode assembly 26. An air channel 40, for supplying air to the cathode electrode 36, is formed on a surface of the second separator 30 facing the membrane electrode assembly 26. A coolant channel 42, through which a coolant flows, is formed between the first separator 28 and the second separator 30 that are adjacent to each other.

The fuel cell stack 12 has a hydrogen gas inlet 44a, a hydrogen gas outlet 44b, an air inlet 46a, an air outlet 46b, a coolant inlet 48a, and a coolant outlet 48b. The hydrogen gas inlet 44a extends through the power generation cells 24 in the stacking direction and is connected to the supply side of the hydrogen gas channel 38. Likewise, the hydrogen gas outlet 44b extends through the power generation cells 24 in the stacking direction and is connected to the discharge side of the hydrogen gas channel 38. The hydrogen gas channel 38, the hydrogen gas inlet 44a, and the hydrogen gas outlet 44b constitute an anode channel.

Likewise, the air inlet 46a extends through the power generation cells 24 in the stacking direction and is connected to the supply side of the air channel 40. The air outlet 46b extends through the power generation cells 24 in the stacking direction and is connected to the discharge side of the air channel 40. The air channel 40, the air inlet 46a, and the air outlet 46b constitute a cathode channel.

The coolant inlet 48a extends through the power generation cells 24 in the stacking direction and is connected to the supply side of the coolant channel 42. The coolant outlet 48b extends through the power generation cells 24 in the stacking direction and is connected to the discharge side of the coolant channel 42.

The fuel gas supply device 14 includes a hydrogen tank 50 that stores high-pressure hydrogen gas. The hydrogen tank 50 is connected to the hydrogen gas inlet 44a of the fuel cell stack 12 through a hydrogen gas supply passage 51 (fuel gas supply channel). The hydrogen gas is supplied to the fuel cell stack 12 through the hydrogen gas supply passage 51.

The hydrogen gas supply passage 51 includes a main channel 52 and a hydrogen bypass channel 53. In the main channel 52, a main injector 54 and an ejector 56 are arranged in series. The hydrogen bypass channel 53 branches off from the main channel 52 at a position upstream of the main injector 54 and is joined to the main channel 52 at a position downstream of the ejector 56. That is, the hydrogen bypass channel 53 bypasses the main injector 54 and the ejector 56.

A BP (bypass) injector 60 is disposed in the hydrogen bypass channel 53. The BP injector 60 is a sub-injector that is used to supply a high-concentration hydrogen gas when high-load power generation is required for the fuel cell stack 12. The main injector 54 is a main injector that is mainly used for a normal operation of the fuel cell stack 12 (when normally generating electric power).

A hydrogen gas discharge passage 62 (anode off-gas pipe) is connected to the hydrogen gas outlet 44b of the fuel cell stack 12. Exhaust hydrogen gas (anode off-gas), which is hydrogen gas that has at least partially been used in the anode electrode 34, is discharged from the fuel cell stack 12 through the hydrogen gas discharge passage 62.

A gas-liquid separator 64 is disposed in the hydrogen gas discharge passage 62. A hydrogen circulation channel 66 branches off from a position downstream of the gas-liquid separator 64, and a downstream portion of the hydrogen circulation channel 66 is connected to the ejector 56. A hydrogen pump 68 is disposed in the hydrogen circulation channel 66. In particular, when activated, the hydrogen pump 68 causes the anode off-gas, which has been discharged to the hydrogen gas discharge passage 62, to circulate to the hydrogen gas supply passage 51 through the hydrogen circulation channel 66 and the ejector 56.

One end of a purge channel 70 is connected to the hydrogen gas discharge passage 62, and a purge valve 72 is disposed in the purge channel 70. One end of a drain channel 74, for draining a fluid mainly including a liquid component, is connected to a bottom portion of the gas-liquid separator 64. A drain valve 76 is disposed in the drain channel 74. The fuel gas supply device 14 includes a pressure sensor 77 for detecting hydrogen gas pressure in the anode channel. The pressure sensor 77 is disposed, for example, in the hydrogen gas supply passage 51 at a position near the hydrogen gas inlet 44a. The pressure sensor 77 sends a detection signal to the controller 22.

The oxidant gas supply device 16 includes an air pump 79, which is disposed in an air supply passage 78 (oxidant gas supply channel) and which corresponds to an oxidant gas supply mechanism. The air pump 79 is a compressor that includes a motor, which corresponds to a rotational driving unit, and that compresses and supplies air. That is, the air pump 79 compresses air as the motor rotates and supplies the compressed air to the fuel cell stack 12 through the air supply passage 78.

Detailed description of the air pump 79 will be omitted, because an air pump having the aforementioned structure is known.

The oxidant gas supply device 16 further includes a water-cooling intercooler 81, which is disposed in the air supply passage 78. In FIG. 1, the intercooler is represented as "I/C".

A drive train, which includes a driving motor and the like for rotating driving wheels (which are not shown), is mounted in a fuel cell vehicle. Coiling water, which is a coolant for cooling the drive train, flows through the water-cooling intercooler 81. The temperature of compressed air decreases by exchanging heat with the cooling water. As can be understood from above, the water-cooling intercooler 81 is a cooler for decreasing the temperature of compressed air.

A temperature sensor 82 for detecting the temperature of the cooling water is disposed at a cooling water outlet of the water-cooling intercooler 81. The temperature sensor 82 sends a signal of information regarding the temperature of the cooling water to the controller 22.

The air supply passage 78 is located downstream of the air pump 79 and connected to the air inlet 46a of the fuel cell stack 12, and a supply on-off valve 83a (inlet shut-off valve) and a humidifier 84 are disposed between the air pump 79 and the air inlet 46a. A bypass supply passage 86, which bypasses the humidifier 84, is connected to the air supply passage 78. An on-off valve 88 is disposed in the bypass supply passage 86.

An air discharge passage 90 (cathode off-gas discharge passage) is connected to the air outlet 46b of the fuel cell stack 12. Exhaust compressed air (cathode off-gas), which is compressed air that has at least partially been used in the cathode electrode 36, is discharged from the fuel cell stack 12 through the air discharge passage 90.

The oxidant gas supply device 16 includes a pressure sensor 91 for detecting the pressure of compressed air in the cathode channel. The pressure sensor 91 is disposed, for example, in the air discharge passage 90 at a position near the air outlet 46b. The pressure sensor 91 sends a detection signal of the detected pressure to the controller 22.

The humidifier 84 is disposed downstream of the air discharge passage 90. Therefore, the humidifier 84 exchanges water and heat between the compressed air supplied from the air pump 79 and the cathode off-gas. A discharge on-off valve 83b (outlet shut-off valve) and a back-pressure valve 92 are disposed in the air discharge passage 90 at positions downstream of the humidifier 84. The other end of the purge channel 70 and the other end of the drain channel 74 are connected and joined to a downstream portion of the air discharge passage 90, thereby forming a diluting portion.

The back-pressure valve 92 is pressure adjusting valve that is used to control the pressure of compressed air supplied to the cathode channel. That is, the internal pressure of the cathode electrode 36 is adjusted by the back-pressure valve 92.

Two ends of an air bypass channel 94 are respectively connected to the air supply passage 78 and the air discharge passage 90 at a position upstream of the supply on-off valve 83a and at a position downstream of the discharge on-off valve 83b and downstream of the back-pressure valve 92. A BP-flow-rate adjusting valve 96, which is used to adjust the flow rate of air that flows through the air bypass channel 94, is disposed in the air bypass channel 94.

An air circulation channel 98 is connected to the air supply passage 78 and the air discharge passage 90 respectively at a position downstream of the supply on-off valve 83a and at a position upstream of the discharge on-off valve 83b. A circulation pump 100 is disposed in the air circulation channel 98. The circulation pump 100 causes discharge air, which has been discharged to the air discharge passage 90, to circulate to the air supply passage 78 through the air circulation channel 98.

The coolant supply device 18 includes a coolant supply passage 102 that is connected to the coolant inlet 48a of the fuel cell stack 12, and a water pump 104 is disposed in the coolant supply passage 102. The coolant supply passage 102 is connected to a radiator 106; and a coolant discharge passage 108, which is connected to the coolant outlet 48b, is connected to the radiator 106.

Figure 3:
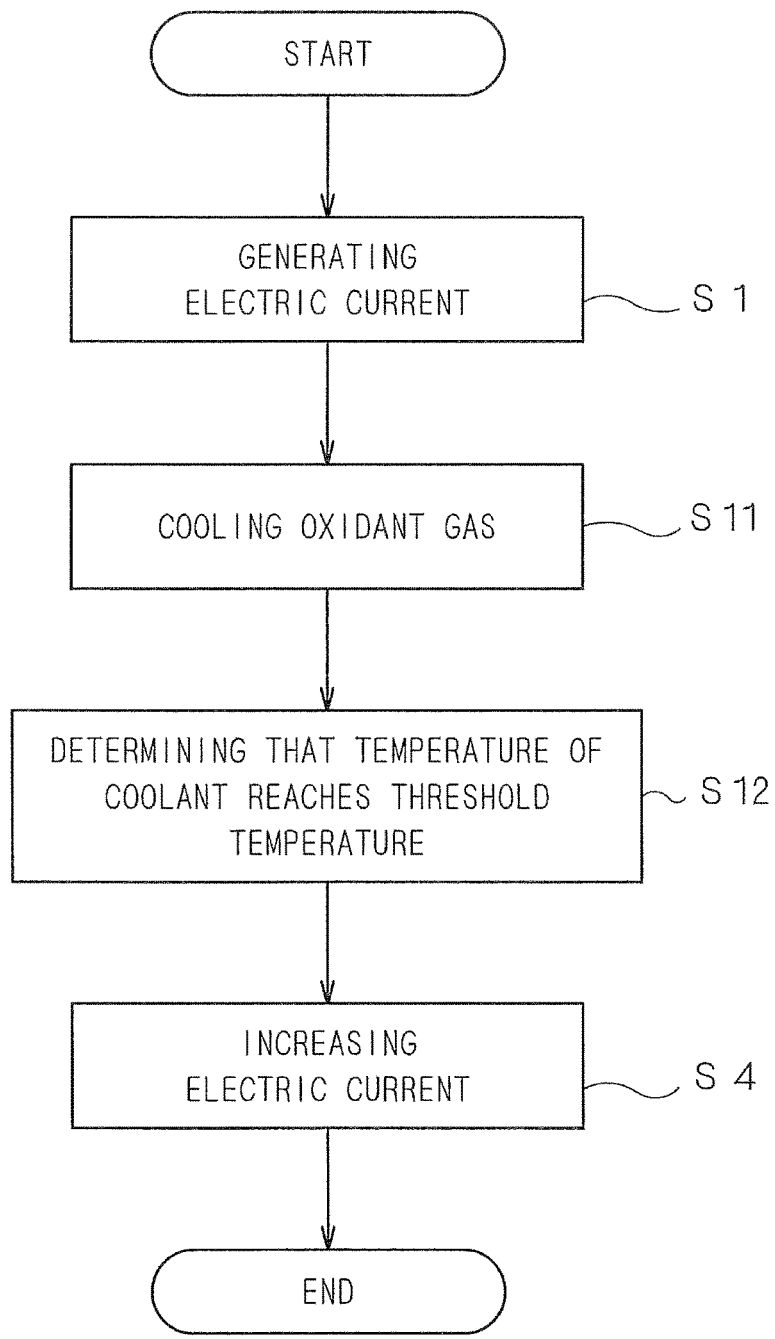
FIG. 3 is flowchart to explain the method according to the embodiment of the present disclosure.
Figure 4:
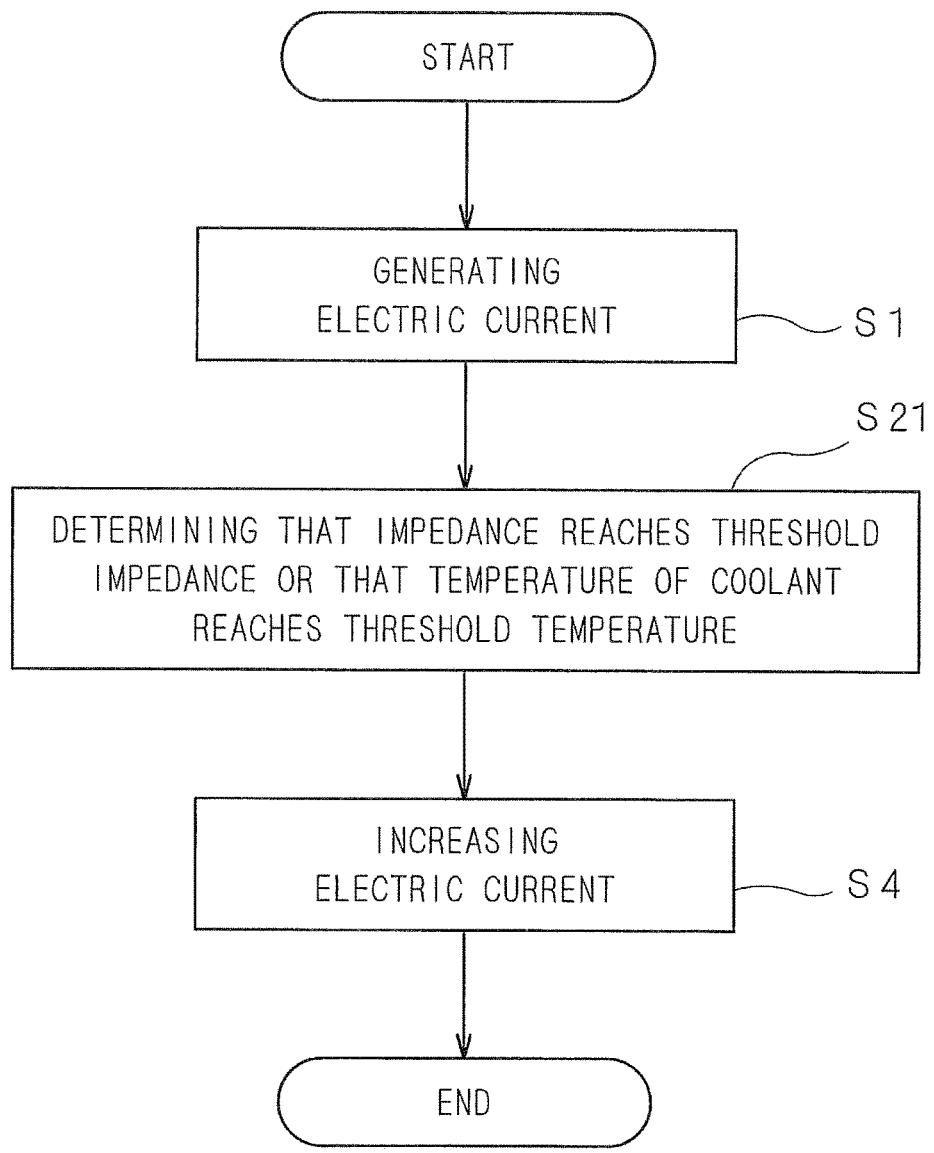
FIG. 4 is flowchart to explain the method according to the embodiment of the present disclosure.

Next, using flowcharts of FIGS. 2-4, a method for controlling the fuel cell system 10 according to the present embodiment will be described in relation to the operation of the fuel cell system 10.

When starting a fuel cell vehicle including the fuel cell system 10, the ignition is turned on and the fuel cell stack 12 is activated. At this time, the controller 22 sends an instruction signal for opening the main injector 54 to supply hydrogen gas from the fuel gas supply device 14 to the anode channel. Thus, a predetermined amount of hydrogen gas is supplied from the hydrogen tank 50 to the hydrogen gas supply passage 51, the hydrogen gas flows through the main injector 54 and the ejector 56 of the main channel 52, and the hydrogen gas is supplied to the hydrogen gas inlet 44a of the fuel cell stack 12.

The hydrogen gas flows from the hydrogen gas inlet 44a into the hydrogen gas channel 38 and moves along the hydrogen gas channel 38. Thus, the hydrogen gas is supplied to the anode electrode 34 of the membrane electrode assembly 26.

Moreover, the controller 22 sends an instruction signal for activating the air pump 79 to supply compressed air from the oxidant gas supply device 16. Accordingly, the air pump 79 rotates to compress air and to feed the compressed air to the air supply passage 78. The compressed air is moistened while passing through the humidifier 84 and then supplied to the air inlet 46a of the fuel cell stack 12. The compressed air flows from the air inlet 46a into the air channel 40 and then moves along the air channel 40, and thereby the compressed air is supplied to the cathode electrode 36 of the membrane electrode assembly 26.

Figure 2:
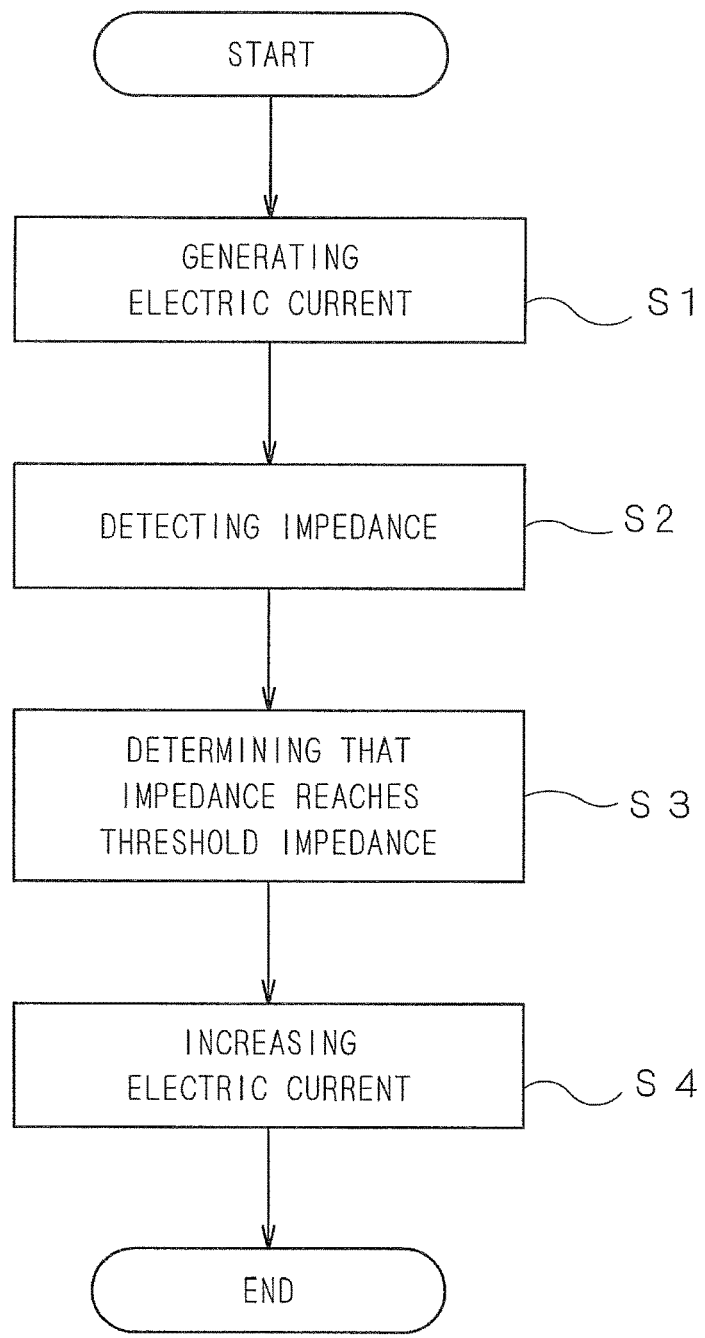
FIG. 2 is flowchart to explain the method according to the embodiment of the present disclosure.

Accordingly, in the membrane electrode assembly 26, the hydrogen gas supplied to the anode electrode 34 and oxygen in the compressed air supplied to the cathode electrode 36 cause an electrochemical reaction in the electrode catalyst layers and electric power is generated (step S1 in FIG. 2). A part of moisture added to the compressed air by the humidifier 84 permeates from the cathode electrode 36 into the solid polymer electrolyte membrane 32 and reaches the anode electrode 34.

In the coolant supply device 18, the water pump 104 operates to supply a coolant, such as pure water, ethylene glycol, oil, or the like from the coolant supply passage 102 to the coolant inlet 48a of the fuel cell stack 12. The coolant flows along the coolant channel 42, cools the power generation cells 24, and then is discharged from the coolant outlet 48b to the coolant discharge passage 108.

The hydrogen gas supplied to the anode electrode 34 and partially consumed is discharged from the hydrogen gas outlet 44b to the hydrogen gas discharge passage 62 as anode off-gas. At this time, the anode off-gas carries moisture (water) that has reached the anode electrode 34 as described above. That is, the anode off-gas that flows into the gas-liquid separator 64 is a moist gas including water.

The gas-liquid separator 64 separates most of water in the anode off-gas. The liquid (water) is discharged from the drain channel 74 when the drain valve 76 is opened. The anode off-gas, from which water has been separated but in which a small amount of mist remains, flows from the hydrogen gas discharge passage 62 into the hydrogen circulation channel 66 as the hydrogen pump 68 operates. Then, the anode off-gas is sucked into the ejector 56 from the hydrogen circulation channel 66, joins a flow of new hydrogen gas that has passed through the main injector 54, and is supplied to the anode channel from the hydrogen gas supply passage 51. Thus, the anode off-gas is circulated and supplied to the fuel cell stack 12.

The anode off-gas that has been discharged to the hydrogen gas discharge passage 62 is discharged (purged), as necessary, to the outside as the purge valve 72 is opened.

Likewise, compressed air that has been supplied to the cathode electrode 36 and partially consumed is discharged from the air outlet 46b to the air discharge passage 90 as cathode off-gas. The cathode off-gas flows through the humidifier 84 to humidify new compressed air supplied from the air supply passage 78, the pressure of the cathode off-gas is adjusted to a set pressure of the back-pressure valve 92, and the cathode off-gas is discharged to the diluting portion. The cathode off-gas, which has been discharged to the air discharge passage 90, is supplied from the air circulation channel 98 to the air supply passage 78 as the circulation pump 100 operates. In this case, the cathode off-gas is also circulated and supplied to the fuel cell stack 12.

While the fuel cell stack 12 is being operated as described above, the impedance measuring unit 23 measures the impedance of the fuel cell stack 12, to be more specific, the impedance of the power generation cells 24 (step S2 in FIG. 2). Moreover, the temperature sensor 82 detects (measures) the temperature of cooling water that has flowed through the water-cooling intercooler 81. The controller 22 constantly acquires information regarding the impedance and information regarding the temperature of cooling water.

For example, when the fuel cell vehicle is idling, a load on the fuel cell stack 12, that is, a required output electric current is low. In this case, the required air flow rate (required oxidant gas flow rate) of the fuel cell stack 12 is also low. Therefore, the controller 22 sends an instruction signal for "decreasing the rotation speed of the motor" to the air pump 79. When the air pump 79 receives the signal, the rotation speed of the motor decreases and the supply flow rate of compressed air decreases. In particular, in an idling state, the rotation speed of the motor becomes the lowest rotation speed, and the supply flow rate of compressed air becomes the lowest supply flow rate.

Therefore, the amount of water generated in the fuel cell stack 12 decreases. Due to the decrease of the generated water, the amount of moisture added to the solid polymer electrolyte membrane 32 decreases, and proton conduction decreases and the impedance of the fuel cell stack 12 (the power generation cells 24) increases.

If the impedance increases excessively, the solid polymer electrolyte membrane 32 becomes excessively dry and it becomes difficult to add moisture to the solid polymer electrolyte membrane 32 again. Thus, in the present embodiment, the controller 22 determines that the solid polymer electrolyte membrane 32 is extremely dry when the impedance of the fuel cell stack 12 becomes a predetermined threshold, and performs predetermined control (step S3 in FIG. 2).

That is, the controller 22 increases the output electric current of the fuel cell stack 12 (step S4 in FIG. 2). In response to this instruction, in the fuel cell stack 12, the electrochemical reaction in the membrane electrode assembly 26 is accelerated, and the reaction rate of the electrochemical reaction increases. Accordingly, in the cathode electrode 36, the amount of water generated due to the electrochemical reaction increases.

The generated water adds moisture to the solid polymer electrolyte membrane 32. Therefore, the solid polymer electrolyte membrane 32 is kept moist. As the impedance increases, the solid polymer electrolyte membrane 32 becomes more likely to be dry. Accordingly, when the impedance is high, preferably, the output electric current is increased. This is because, by doing so, the electrochemical reactions are accelerated further and the amount of generated water increases further, and therefore the solid polymer electrolyte membrane 32 is easily kept moist.

The increased output electric current is used, for example, to charge the battery 20, and thus consumed. The battery 20 is overcharged if the battery 20 is charged after having been fully charged. To avoid this, after the battery 20 has been fully charged, supply of an electric current to the battery 20 is finished.

In this case, preferably, the amount of increase in the output electric current is within a range with which the air pump 79 can maintain the lowest supply flow rate. That is, for example, if the air pump 79 has a function of supplying compressed air with a flow rate exceeding the lowest supply flow rate when the electric current is 25 A or larger, the output electric current can be increased to about 25 A.

In other words, in the above case, the air pump 79 supplies compressed air at the lowest supply flow rate until the output electric current becomes 25 A or larger. Therefore, by setting the upper limit of the output electric current lower than 25A, an increase in the supply flow rate of compressed air from the air pump 79 can be avoided. Thus, the solid polymer electrolyte membrane 32 is prevented from becoming dry due to an increase in the amount of compressed air that contacts the cathode electrode 36. Moreover, because the operation amount of the oxidant gas supply mechanism does not change, a user of the fuel cell vehicle does not experience an unpleasant sensation.

Moreover, because an increase in the output electric current can be managed as described above, the output of the fuel cell stack 12 does not vary. Also for this reason, the driver is further prevented from experiencing an unpleasant sensation.

After the impedance has sufficiently decreased, the controller 22 makes the output electric current of the fuel cell stack 12 to return to the original value. Subsequently, when the impedance increases again and reaches the predetermined threshold, the control is performed again.

Instead of the control described above, control based on the temperature of cooling water that has flowed through the water-cooling intercooler 81. This case will be described below.

As described above, after step S1, cooling water for cooling the drive train flows through the water-cooling intercooler 81. By using the cooling water, high-temperature compressed air obtained by the air pump 79 is cooled (step S11 in FIG. 3), and the temperature of the compassed air decreases. In other words, the compressed air is not sufficiently cooled when the temperature of the cooling water is high, and the compressed air having a comparatively high temperature flows through the air supply passage 78.

The compressed air flows into the humidifier 84, and the humidifier 84 exchanges heat with the cathode off-gas. In this case, as the temperature of compressed air increases, the temperature difference between the compressed air and the cathode off-gas is low, and therefore the amount of moisture added is small. That is, in this case, compressed air, to which a sufficient amount of moisture has not been added, is supplied to the cathode electrode 36. As a result, the solid polymer electrolyte membrane 32 is likely to become dry.

In this case, the controller 22 determines whether or not the temperature of the coolant, which is measured by using a temperature sensor 82 disposed at a cooling water outlet of the water-cooling intercooler 81, has reached a predetermined threshold. When the temperature of the coolant becomes the predetermined threshold (step S12 in FIG. 3), the controller 22 determines that the solid polymer electrolyte membrane 32 is extremely dry, and performs predetermined control. That is, in the same way as described above, the controller 22 sends an instruction for increasing the output electric current of the fuel cell stack 12 (step S4 in FIG. 3). In response to this instruction, the electrochemical reaction in the membrane electrode assembly 26 is accelerated.

As a result, the amount of generated water increases. The generated water adds moisture to the solid polymer electrolyte membrane 32, and the solid polymer electrolyte membrane 32 is kept moist.

As the temperature of the cooling water increases, the temperature of compressed air that flows into the humidifier 84 increases, and the solid polymer electrolyte membrane 32 is more likely to become dry. Accordingly, when the temperature of the cooling water is high, preferably, the output electric current is increased. This is because, also in this case, the electrochemical reaction is further accelerated, the amount of generated water further increases, and therefore the solid polymer electrolyte membrane 32 can be kept moist easily.

The increased output electric current may be consumed by being stored in the battery 20 in the same way as described above.

After the temperature of the cooling water has sufficiently decreased, the controller 22 returns the output electric current required for the fuel cell stack 12 to the original level. Subsequently, if the temperature of the cooling water increases again and reaches the predetermined threshold, the above control is performed again.

The two control methods described above may be used in combination. In this case, after step S1, the output electric current of the fuel cell stack 12 may be increased when the impedance reaches a predetermined threshold or the temperature of the cooling water reaches a predetermined threshold (steps S21 and S4 in FIG. 4).

By performing control as described above, the solid polymer electrolyte membrane 32 can be prevented from becoming excessively dry.

The present disclosure is not limited to the embodiment described above, which can be modified in various ways within the spirit and scope of the present disclosure.

For example, the use of the fuel cell system 10 is not limited to a vehicle. The fuel cell system 10 may be a stationary system.

According to one aspect of the disclosure, provides a method for controlling a fuel cell system including a fuel cell that includes a solid polymer electrolyte membrane and that generates electric power by causing an electrochemical reaction between a fuel gas and an oxidant gas, a fuel gas supply device that supplies the fuel gas into the fuel cell, an oxidant gas supply device including an oxidant gas supply mechanism that supplies the oxidant gas into the fuel cell, and an impedance measuring unit that measures an impedance of the fuel cell. The method includes increasing an output electric current of the fuel cell when the impedance measured by the impedance measuring unit reaches a predetermined threshold.

As the output electric current increases, the electrochemical reaction in the electrodes of the fuel cell is accelerated. As a result, the reaction rate increases and the amount of generated water increases. Because the generated water adds moisture to the solid polymer electrolyte membrane, the solid polymer electrolyte membrane can be prevented from becoming excessively dry. This is particularly effective when the solid polymer electrolyte membrane is likely to become dry even in an idling electric power generation state, in which the oxidant gas supply mechanism supplies the oxidant gas at the lowest supply flow rate.

As the impedance increases, the solid polymer electrolyte membrane is more likely to become dry. Therefore, preferably, the output electric current is increased by a large amount when the impedance is high. In this case, the electrochemical reaction is further accelerated and the amount of generated water further increases, and therefore a sufficient amount of moisture can be added to the solid polymer electrolyte membrane.

Instead of using the impedance, determination may be made by using the temperature of a coolant for cooling the oxidant gas, which flows through a cooler. Another aspect of the present disclosure provides a method for controlling a fuel cell system including a fuel cell that includes a solid polymer electrolyte membrane and that generates electric power by causing an electrochemical reaction between a fuel gas and an oxidant gas, a fuel gas supply device that supplies the fuel gas into the fuel cell, and an oxidant gas supply device including an oxidant gas supply mechanism that supplies the oxidant gas into the fuel cell and a cooler that cools the oxidant gas by using a coolant. The method includes increasing an output electric current of the fuel cell when a temperature of the coolant reaches a predetermined threshold.

Also in this case, the electrochemical reaction in the electrodes of the fuel cell is accelerated as the output electric current increases. Accordingly, it is possible to prevent the solid polymer electrolyte membrane from becoming excessively dry.

As the temperature of the coolant increases, the solid polymer electrolyte membrane is more likely to become dry. Therefore, the output electric current is increased by a large amount when the temperature of the coolant is high. In this case, as in the above case, the electrochemical reaction is further accelerated and the amount of generated water further increases, and therefore a sufficient amount of moisture can be added to the solid polymer electrolyte membrane.

By using both of the impedance and the temperature of the coolant for cooling the oxidant gas, determination may be made on the basis of a condition on the impedance is satisfied or a condition on the temperature. Another aspect of the present disclosure provides a method for controlling a fuel cell system including a fuel cell that includes a solid polymer electrolyte membrane and that generates electric power by causing an electrochemical reaction between a fuel gas and an oxidant gas, a fuel gas supply device that supplies the fuel gas into the fuel cell, an oxidant gas supply device including an oxidant gas supply mechanism that supplies the oxidant gas into the fuel cell and a cooler that cools the oxidant gas by using a coolant, and an impedance measuring unit that measures an impedance of the fuel cell. The method includes increasing an output electric current of the fuel cell when the impedance measured by the impedance measuring unit reaches a predetermined threshold or a temperature of the coolant reaches a predetermined threshold.

In this case, when the solid polymer electrolyte membrane is likely to become dry, control for increasing the amount of generated water is performed. Accordingly, the solid polymer electrolyte membrane can be more easily prevented from becoming dry.

This control may be performed so that, when the impedance reaches the predetermined threshold before the temperature of the coolant reaches the predetermined threshold, the output electric current is increased by a larger amount as the impedance increases. Conversely, this control may be performed so that, when the temperature of the coolant reaches the predetermined threshold before the impedance reaches the predetermined threshold, the output electric current is increased by a larger amount as the temperature of the coolant increases.

The increased amount of the output electric current may be used, for example, to charge a battery and consumed. If charging is continued after the battery has been fully charged, the battery becomes overcharged. Preferably, charging of the battery is finished when the battery becomes fully charged.

In the above cases, the oxidant gas supply mechanism may supply the oxidant gas at a lowest supply flow rate when the fuel cell is performing idling electric power generation, and the oxidant gas supply mechanism may maintain the lowest supply flow rate when increasing the output electric current (idling electric current) of the fuel cell. In other words, preferably, the amount of increase in the output electric current is within a range of electric current value with which the oxidant gas supply mechanism maintains the lowest supply flow rate.

In this case, although the output electric current is increased, the supply flow rate of the oxidant gas from the oxidant gas supply mechanism is maintained at the lowest supply flow rate. Accordingly, increase in the supply flow rate of the oxidant gas to the cathode electrode is avoided, and therefore it is possible to prevent the solid polymer electrolyte membrane from becoming dry. Moreover, because the operation amount of the oxidant gas supply mechanism does not change, a user can be prevented from experiencing an unpleasant sensation.

With the present disclosure, information regarding the impedance of the fuel cell is obtained and/or information regarding the temperature of the coolant that cools the oxidant gas and that flows through the cooler are/is obtained. Preferably, both of the information regarding the impedance of the fuel cell and the information regarding the temperature of the coolant are obtained. The output electric current of the fuel cell stack is increased when the impedance reaches a predetermined threshold, when the temperature of the cooling water reaches a predetermined threshold, or, preferably, when the impedance reaches a predetermined threshold or the temperature of the cooling water reaches a predetermined threshold. Therefore, the amount of generated water increases, and moisture is added to the solid polymer electrolyte membrane of the fuel cell. Accordingly, the solid polymer electrolyte membrane can be prevented from becoming excessively dry.

This control is particularly effective when idling electric power generation, in which the oxidant gas supply mechanism supplies the oxidant gas at the lowest supply flow rate, is being performed and the solid polymer electrolyte membrane is likely to become dry although the supply flow rate of the oxidant gas cannot be reduced.

Obviously, numerous modifications and variations of the present invention are possible in light of the above teachings. It is therefore to be understood that within the scope of the appended claims, the invention may be practiced otherwise than as specifically described herein.

What is claimed is:

1. A method for controlling a fuel cell system including a fuel cell, comprising:
   generating electric current via an electrochemical reaction between a fuel gas and an oxidant gas by the fuel cell including a solid polymer electrolyte membrane;
   detecting, using a controller, an impedance of the fuel cell;
   determining, using the controller, whether the impedance increases to a threshold impedance; and
   increasing, using the controller, the electric current generated by the fuel cell when the impedance is determined to increase to the threshold impedance, wherein an amount of water generated in the fuel cell increases when the electric current is increased,
   wherein an oxidant gas supply mechanism supplies the oxidant gas at a lowest supply flow rate when the fuel cell is performing idling electric power generation, and the oxidant gas supply mechanism maintains the lowest supply flow rate when increasing the electric current.

2. The method according to claim 1,
   wherein the electric current is increased by a larger amount as the impedance increases.

3. The method according to claim 1,
   wherein a battery is charged with the electric current, and charging of the battery is finished when the battery becomes fully charged.

4. The method according to claim 1, wherein the impedance is measured to detect the impedance.

5. The method according to claim 1, wherein the impedance is monitored to determine whether the impedance increases to the threshold impedance.

6. The method according to claim 1, wherein an instruction signal is sent to increase the electric current.

7. A method for controlling a fuel cell system including a fuel cell, comprising:
   generating electric current via an electrochemical reaction between a fuel gas and an oxidant gas by the fuel cell including a solid polymer electrolyte membrane;
   cooling oxidant gas supplied to the fuel cell with a coolant cooled by a radiator;
   determining, using a controller, whether a temperature of the coolant increases to a threshold temperature; and
   increasing, using the controller, the electric current generated by the fuel cell when the temperature of the coolant is determined to increase to the threshold temperature, wherein an amount of water generated in the fuel cell increases when the electric current is increased,
   wherein an oxidant gas supply mechanism supplies the oxidant gas at a lowest supply flow rate when the fuel cell is performing idling electric power generation, and the oxidant gas supply mechanism maintains the lowest supply flow rate when increasing the electric current.

8. The method according to claim 7,
   wherein the electric current is increased by a larger amount as the temperature of the coolant increases.

9. The method according to claim 7, wherein an intercooler through which the coolant flows is provided to cool the oxidant gas.

10. The method according to claim 7, wherein the temperature is monitored to determine whether the temperature increases to the threshold temperature.

11. The method according to claim 7, wherein an instruction signal is sent to increase the electric current.

12. The method according to claim 7, wherein the oxidant gas is cooled by the coolant prior to being supplied to an inlet of the fuel cell.

13. A method for controlling a fuel cell system including a fuel cell, comprising:
   generating electric current via an electrochemical reaction between a fuel gas and an oxidant gas by the fuel cell including a solid polymer electrolyte membrane;

detecting, using a controller, an impedance of the fuel cell;

determining, using the controller, whether the impedance increases to a threshold impedance;

cooling oxidant gas supplied to the fuel cell with a coolant cooled by a radiator;

determining, using the controller, whether a temperature of the coolant increases to a threshold temperature; and increasing, using the controller, the output electric current generated by the fuel cell when the impedance is determined to increase to the threshold impedance or when the temperature of the coolant is determined to increase to the threshold temperature, wherein an amount of water generated in the fuel cell increases when the output electric current is increased, wherein an oxidant gas supply mechanism supplies the oxidant gas at a lowest supply flow rate when the fuel cell is performing idling electric power generation, and the oxidant gas supply mechanism maintains the lowest supply flow rate when increasing the electric current.

14. The method according to claim 13, wherein, when the impedance increases to the threshold impedance, the electric current is increased by a larger amount as the impedance increases, and, when the temperature of the coolant increases to the threshold temperature, the electric current is increased by a larger amount as the temperature of the coolant increases.

15. The method according to claim 13, wherein the oxidant gas is cooled by the coolant prior to being supplied to an inlet of the fuel cell.

* * * * *